US008438285B2

(12) United States Patent
Brown et al.

(10) Patent No.: US 8,438,285 B2
(45) Date of Patent: May 7, 2013

(54) SYSTEM FOR MANAGING RESOURCES ACCESSIBLE TO A MOBILE DEVICE SERVER

(75) Inventors: William A. Brown, Woodstock, GA (US); Troy C. Meuninck, Newnan, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 266 days.

(21) Appl. No.: 12/883,029

(22) Filed: Sep. 15, 2010

(65) Prior Publication Data
US 2012/0066392 A1 Mar. 15, 2012

(51) Int. Cl.
*G06F 15/16* (2006.01)
*G06F 15/173* (2006.01)

(52) U.S. Cl.
USPC .............. 709/226; 709/224; 709/229

(58) Field of Classification Search ............ 709/226, 709/223, 203, 217–219, 231, 224, 225, 227–229; 455/410, 412, 414
See application file for complete search history.

(56) References Cited

U.S. PATENT DOCUMENTS

| 5,761,421 | A | 6/1998 | Van Hoff |
| 6,938,156 | B2 | 8/2005 | Wheeler et al. |
| 7,412,727 | B2 | 8/2008 | Kim |
| 7,430,753 | B2 | 9/2008 | Gray |
| 7,492,899 | B2 | 2/2009 | Qiao |
| 7,634,076 | B2 | 12/2009 | Lee et al. |
| 7,720,986 | B2 | 5/2010 | Savoor |
| 7,756,130 | B1 | 7/2010 | Lee |
| 8,015,253 | B1 | 9/2011 | Zapata et al. |
| 8,108,916 | B2 | 1/2012 | Fink et al. |
| 8,116,808 | B2 * | 2/2012 | Amine ................. 455/550.1 |
| 2002/0157002 | A1 | 10/2002 | Messerges et al. |
| 2002/0184301 | A1 | 12/2002 | Parent |
| 2004/0253923 | A1 | 12/2004 | Braley |
| 2005/0010637 | A1 | 1/2005 | Dempski et al. |
| 2005/0251821 | A1 | 11/2005 | Pina |
| 2006/0098593 | A1 | 5/2006 | Edvardsen et al. |
| 2006/0123099 | A1 | 6/2006 | Paila |
| 2006/0172700 | A1 | 8/2006 | Wu |
| 2006/0193456 | A1 | 8/2006 | Light et al. |

(Continued)

OTHER PUBLICATIONS

Davies, C. , "i-Jetty Turns Android Cellphone Into Mobile Webserver", 6 pages, http://www.phonemag.com/i-jetty-turns-android-cellphone-into-mobile-webserver-031762..., posted Mar. 17, 2008, website last visited Oct. 1, 2010.

(Continued)

*Primary Examiner* — Ruolei Zong
(74) *Attorney, Agent, or Firm* — Guntin & Gust, PLC; Andrew Gust

(57) ABSTRACT

A system that incorporates teachings of the present disclosure may include, for example, a non-transitory computer-readable storage medium operating in a mobile device server having computer instructions to execute a web server application in the mobile device server. The web server application can be operable to detect a resource control manager while roaming in a communication zone of the resource control manager, and to transmit a pairing key to the resource control manager. The web server application can also be operable to receive from the resource control manager authorization to pair with one or more resources selected by the resource control manager according to the pairing key, and to establish communications with the one or more resources selected by the resource control manager. Other embodiments are disclosed.

20 Claims, 7 Drawing Sheets

U.S. PATENT DOCUMENTS

| | | | |
|---|---|---|---|
| 2007/0019670 | A1 | 1/2007 | Falardeau |
| 2007/0055783 | A1 | 3/2007 | Gourraud |
| 2007/0097860 | A1 | 5/2007 | Rys |
| 2007/0142036 | A1* | 6/2007 | Wikman et al. ............ 455/414.1 |
| 2008/0195406 | A1 | 8/2008 | Matsumoto |
| 2008/0320534 | A1 | 12/2008 | Wang et al. |
| 2009/0031360 | A1 | 1/2009 | Kidd et al. |
| 2009/0063193 | A1 | 3/2009 | Barton et al. |
| 2009/0088197 | A1 | 4/2009 | Stewart |
| 2009/0089183 | A1 | 4/2009 | Afram et al. |
| 2009/0093237 | A1 | 4/2009 | Levenshteyn |
| 2009/0106366 | A1* | 4/2009 | Virtanen et al. ............ 709/206 |
| 2009/0171985 | A1 | 7/2009 | Tischer |
| 2009/0193486 | A1 | 7/2009 | Patel et al. |
| 2009/0288122 | A1 | 11/2009 | Zellner |
| 2009/0298514 | A1 | 12/2009 | Ullah |
| 2009/0327702 | A1 | 12/2009 | Schnell |
| 2009/0328118 | A1 | 12/2009 | Ravishankar |
| 2009/0328228 | A1 | 12/2009 | Schnell |
| 2010/0052853 | A1 | 3/2010 | Hilton |
| 2010/0058398 | A1* | 3/2010 | Ojala et al. ...................... 725/62 |
| 2010/0071021 | A1* | 3/2010 | Friedman ...................... 725/133 |
| 2010/0076274 | A1 | 3/2010 | Severson |
| 2010/0197238 | A1 | 8/2010 | Pathuri et al. |
| 2010/0275249 | A1 | 10/2010 | McCann et al. |
| 2010/0328547 | A1 | 12/2010 | Mayorga |
| 2011/0197264 | A1* | 8/2011 | McDade ........................... 726/4 |
| 2011/0258437 | A1 | 10/2011 | McKelvey |

OTHER PUBLICATIONS

Lin, et al., "On Controlling Digital TV Set-Top-Box by Mobile Devices via IP Network", 8 pages, Proceedings of the Seventh IEEE International Symposium on Multimedia (ISM '05), Computer Society, 2005,.

Linux Devices, "Intel 'Personal Server' Research: Mobile Computing in the Palm of your Hand", pp. 1-4, http://www.linuxfordevices.com/c/a/Linux-For-Devices-Articles/Intel-Personal-Server-res..., website last visited Oct. 1, 2010.

Opensource, "MWS: Rationale—A Website on a Mobile Computing in the Palm of your Hand", pp. 1-4, http://wiki.opensource.nokia.com/projects/MWS:Rationale, website last visited Oct. 1, 2010.

Soroko, Jonathan , "Web Server on Your Cellphone—a New Design Space", pp. 1-4, Popular Logistics, Feb. 16, 2010.

Toorani, et al., "LPKI—A Lightweight Public Key Infrastructure for the Mobile Environments", pp. 162-166, IEEE 2008, ICCS 2008.

Wikipedia, "Mobile Web Server", pp. 1-3, website last visited Oct. 1, 2010.

Wikipedia, "Mobile Web Server (Symbian OS)", 1 page, http://en.wikipedia.org/wiki/Mobile_Web_Server_(Symbian_Os), website last visited Oct. 1, 2010.

Zimmerly, Bill , "A Tiny Cloud in Android", 17 pages article, website last visited Oct. 1, 2010, http://www.ibm.com/developerworks/opensources/library/os-tinycloud/index.html.

* cited by examiner

700

SYSTEM FOR MANAGING RESOURCES ACCESSIBLE TO A MOBILE DEVICE SERVER

FIELD OF THE DISCLOSURE

The present disclosure relates generally to device communication techniques and more specifically to a system for managing resources accessible to a mobile device server.

BACKGROUND

Media communication systems such as interactive television systems can deliver media content to media processors such as set-top boxes. Generally, media content can be broadcast by these systems and delivered according to the type of services users have subscribed to. In interactive media communication systems, users can also request services on demand. Portable media devices such as mobile phones or media players such as the iPod™ can be adapted to communicate with media processors over a wireless medium. The combined services of portable and fixed media devices can provide users a rich environment for utilizing multimedia services.

DETAILED DESCRIPTION

Figure 1:
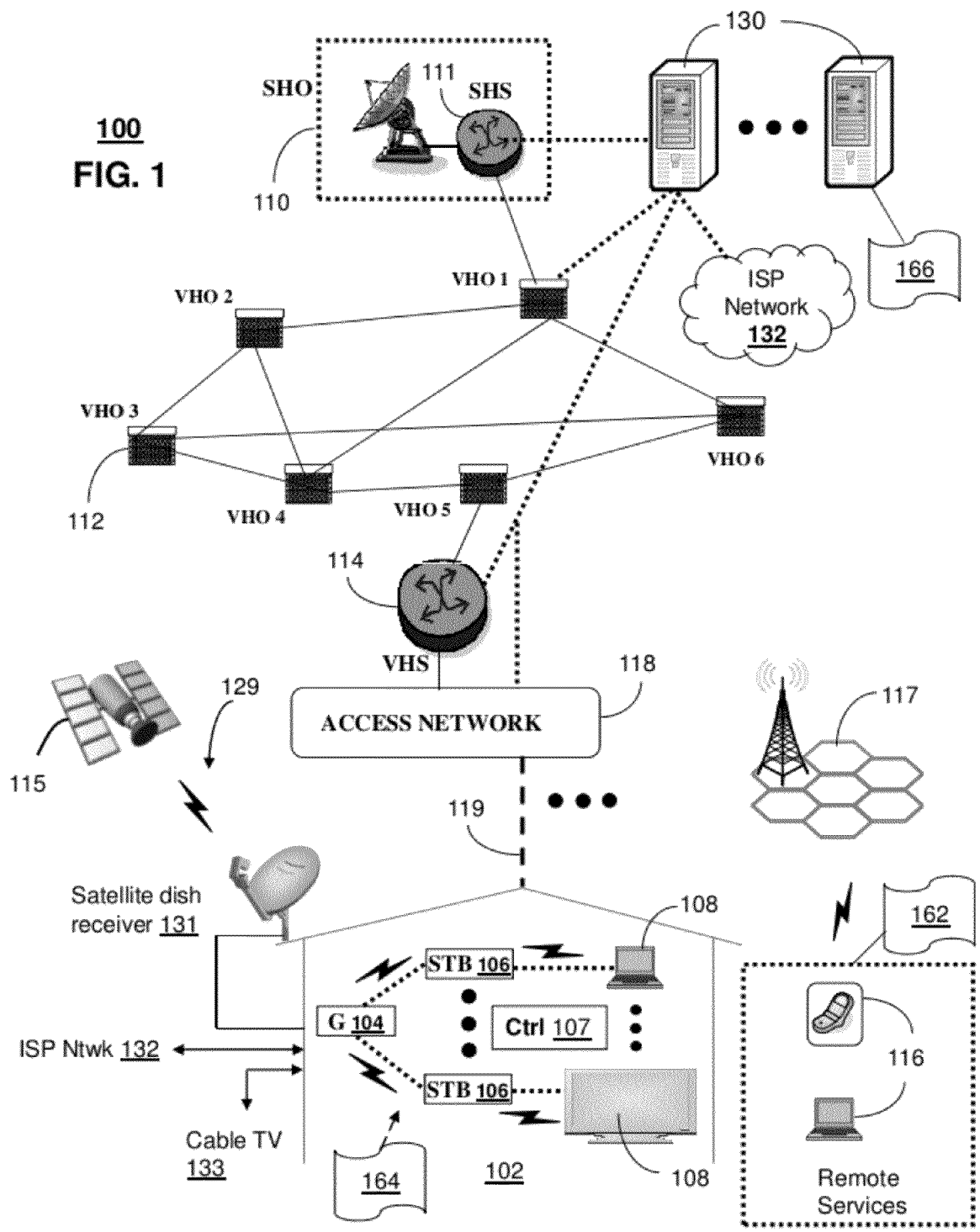
FIGS. 1-2 depict illustrative embodiments of communication systems that provide media services.

The present disclosure describes, among other things, illustrative embodiments of a mobile device server for establishing communications and exchanging messages with a resource control manager that manages resources capable of supplying and presenting media content of various forms to the mobile device server. The mobile device server can include a web server application operating therein to utilize media resources of the resource control manager. Resources can be made available to the mobile device server according to an identifier assigned to the mobile device server or an identifier assigned a software application operating under the control of the web server application. Other embodiments are contemplated by the present disclosure as presented below.

One embodiment of the present disclosure can include a portable communication device having a controller. The controller can be operable to execute a web server application in the portable communication device. The web server application can be operable to detect a resource control manager while roaming. The resource control manager can operate from a computing device that is communicatively coupled to a plurality of resources accessible to the portable communication device, which the resource control manager controls. The web server application is also operable to establish communications with the resource control manager and to transmit a pairing key to the resource control manager. The web server application can be further operable to receive authorization from the resource control manager to pair with one or more resources selected by the resource control manager from the plurality of resources according to the pairing key and to establish communications with the one or more resources selected by the resource control manager.

One embodiment of the present disclosure includes a non-transitory computer-readable storage medium operating in a mobile device server having computer instructions to execute a web server application in the mobile device server. The web server application can be operable to detect a resource control manager while roaming in a communication zone of the resource control manager, and to transmit a pairing key to the resource control manager. The web server application can also be operable to receive authorization from the resource control manager to pair with one or more resources selected by the resource control manager according to the pairing key, and to establish communications with the one or more resources selected by the resource control manager.

One embodiment of the present disclosure includes a resource control manager having a controller to manage a plurality of resources communicatively coupled to the resource control manager, and to receive a pairing key from a web server application operating in a mobile device server. The controller can also be operable to identify a service grade from the pairing key, and to select one or more resources from the plurality of resources according to the service grade. The controller can be further operable to transmit to the mobile device server authorization to pair with the one or more resources selected by the resource control manager. The mobile device server can establish communications with the one or more resources responsive to the authorization received from the resource control manager.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, and combinations thereof. The SHS server 111 can forward packets associated with the media content to one or more video head-end servers (VHS) 114 via a network of video head-end offices (VHO) 112 according to a multicast communication protocol.

The VHS 114 can distribute multimedia broadcast content via an access network 118 to commercial and/or residential buildings 102 that house a gateway 104 (such as a residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered communication technologies (such as coaxial, powerline, or phone line wiring) or can operate over a wireless access protocol such as Wireless Fidelity (WiFi). By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can also be used in the media system of FIG. 1. The satellite broadcast television system 129 can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services also.

It is contemplated that the present disclosure can apply to any present or next generation over-the-air and/or landline media content services system.

Some of the network elements of the IPTV media system can also be coupled to one or more computing devices 130, a portion of which can operate as a web server for providing portal services over an Internet Service Provider (ISP) network 132 to wireline media devices 108 or wireless communication devices 116.

All forms of media services can be offered to media devices over landline technologies such as those described above. Additionally, media services can be offered to media devices by way of a wireless access base station 117 operating according to wireless access protocols such as Wireless Fidelity (WiFi), or cellular communication technologies (such as GSM, CDMA, UMTS, WiMAX, Software Defined Radio or SDR, and so on).

System 100 can also provide for all or a portion of the computing devices 130 to function as a remote server (herein referred to as server 130). The server 130 can use computing and software technology 166 to perform the function of processing requests generated by a web server application 162 operating in portable communication devices, such as those shown in reference 108 or 116 (herein referred to as a mobile device servers). Server 130 can also be used to control operations of a resource control manager 164 which can operate from the residential gateway 104, the media processor 106 or other computing devices in building 102. Illustrative embodiments of methods that can operate in portions of the devices of FIG. 1 are described below.

Figure 2:
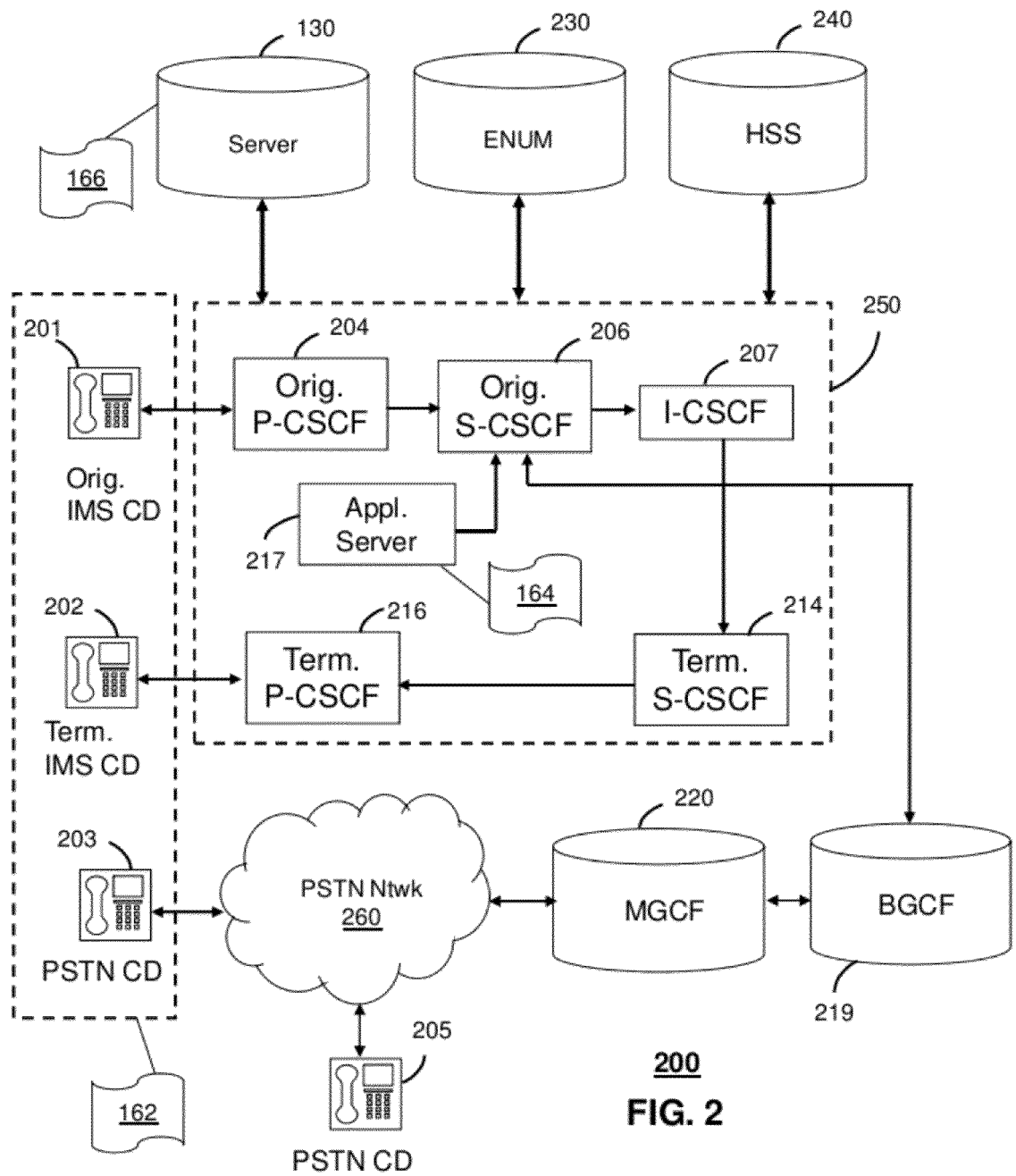

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260. The MGCF 220 is not used when a communication session involves IMS CD to IMS CD communications. A communication session involving at least one PSTN CD utilizes the MGCF 220.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to an application server (AS) such as reference 217 that can provide a variety of services to IMS subscribers. For example, the application server 217 can be used to perform originating treatment functions on the calling party number received by the originating S-CSCF 206 in the SIP INVITE message. Originating treatment functions can include determining whether the calling party number has international calling services, and/or is requesting special telephony features (e.g., *72 forward calls, *73 cancel call forwarding, *67 for caller ID blocking, and so on).

Additionally, the originating S-CSCF 206 can submit queries to the ENUM system 230 to translate an E.164 telephone number in the SIP INVITE to a SIP Uniform Resource Identifier (URI) if the terminating communication device is IMS compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260.

The aforementioned communication process is symmetrical. Accordingly, the terms "originating" and "terminating" in FIG. 2 are interchangeable. It is further noted that communication system 200 can be adapted to support video conferencing. In addition, communication system 200 can be adapted to provide the IMS CDs 201, 203 with the multimedia and Internet services of communication system 100.

System 200 can include or otherwise be coupled with computing devices 130 of FIG. 1 for purposes similar to those described above. It is further contemplated by the present disclosure that a web server application 162 can operate from any of the communication devices (e.g., references 201, 202, 203, and 205) depicted in FIG. 2. It is further contemplated that these devices can communicate with a resource control manager 164 operating from, for example, the AS 217, to gain access to resources managed thereby. Illustrative embodiments of methods that can operate in portions of the devices of FIG. 2 are described below.

Figure 3:
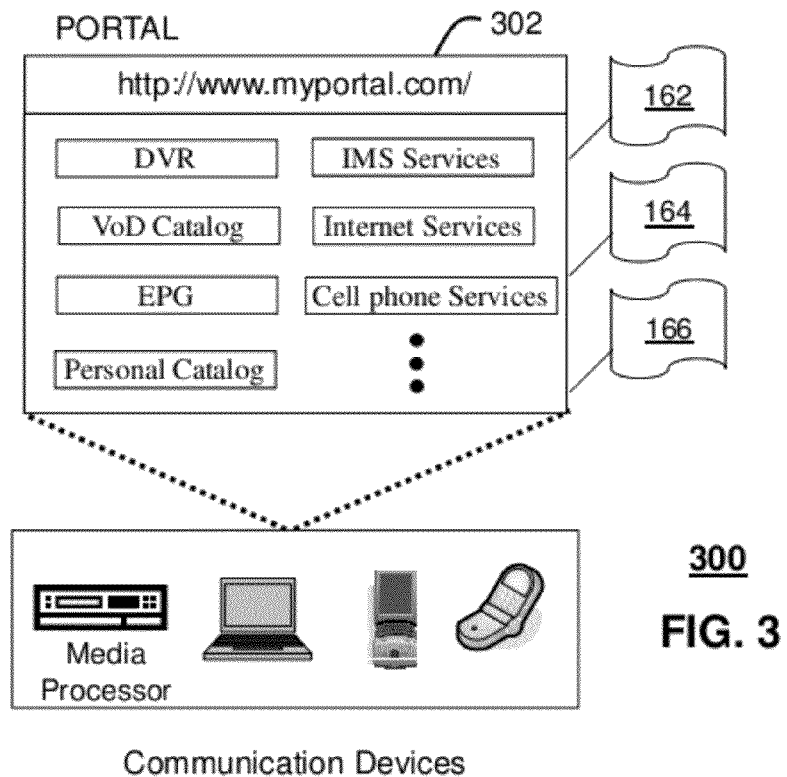
FIG. 3 depicts an illustrative embodiment of a portal that can interact with the communication systems of FIGS. 1-2.

FIG. 3 depicts an illustrative embodiment of a portal 302 which can operate from the computing devices 130 of the communication system 100 illustrated in FIG. 1. The portal 302 can be used for managing services of communication systems 100-200. The portal 302 can be accessed by a Uniform Resource Locator (URL) with a Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, or a personal catalog (such as personal videos, pictures, audio recordings, etc.) stored in the media processor 106. The portal 302 can also be used for provisioning IMS services described earlier, provisioning Internet services, provisioning cellular phone services, and so on.

It is contemplated by the present disclosure that the portal 302 can further be utilized to manage and provision software applications 162, 164, 166 of a mobile device server, a resource control manager, and a remote server, respectively, as described earlier. Illustrative embodiments of methods that can operate in portions of the portal 302 of FIG. 3 are described below.

Figure 4:
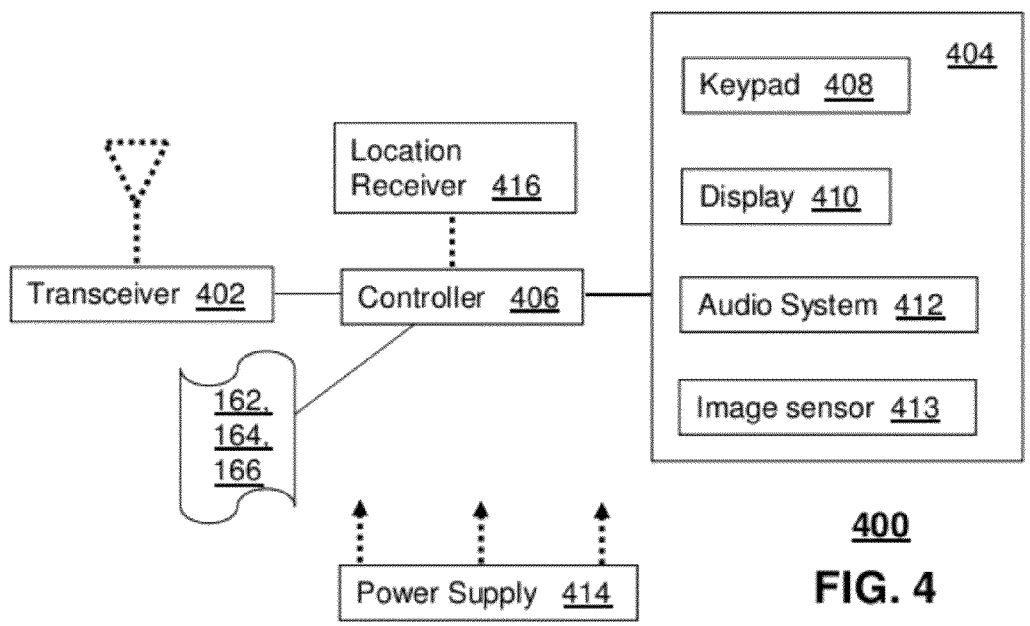
FIG. 4 depicts an illustrative embodiment of a communication device that can be utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying information to an end user of the communication device 400. In an embodiment where the display 410 is touch-sensitive, a portion or all of the keypad 408 can be presented by way of the display 410.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize power management technologies such as replaceable and rechargeable batteries, supply regulation technologies, and charging system technologies for supplying energy to the components of the communication device 400 to facilitate long-range or short-range portable applications. The location receiver 416 can utilize location technology such as a global positioning system (GPS) receiver for identifying a location of the communication device 400 based on signals generated by a constellation of GPS satellites, thereby facilitating location services such as navigation.

The communication device 400 can use the transceiver 402 to also determine a proximity to a cellular, WiFi or Bluetooth access point by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

It is further contemplated by the present disclosure that the communication device 400 can operate as a resource control manager or a mobile device server from which a web server application operates as described below. It follows from these illustrations that the controller 406 can be adapted in various embodiments to perform the functions 162, 164, 166 of the mobile device server, resource control manager, and remote server, respectively. Illustrative embodiments of methods that can operate in portions of the communication device 400 of FIG. 4 are described below.

Figure 5:
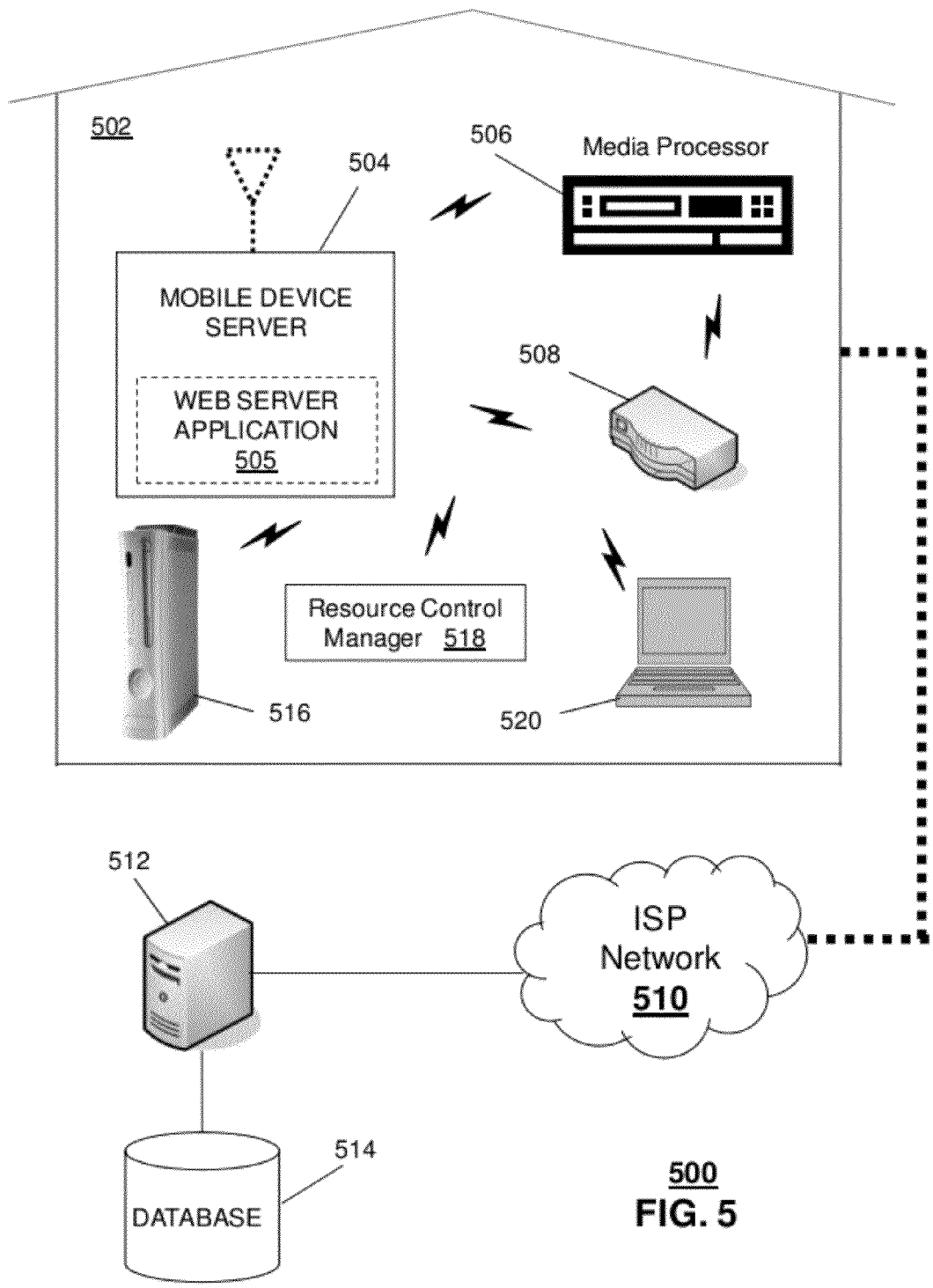
FIG. 5 depicts an illustrative embodiment of a system with computing and media resources.
Figure 6:
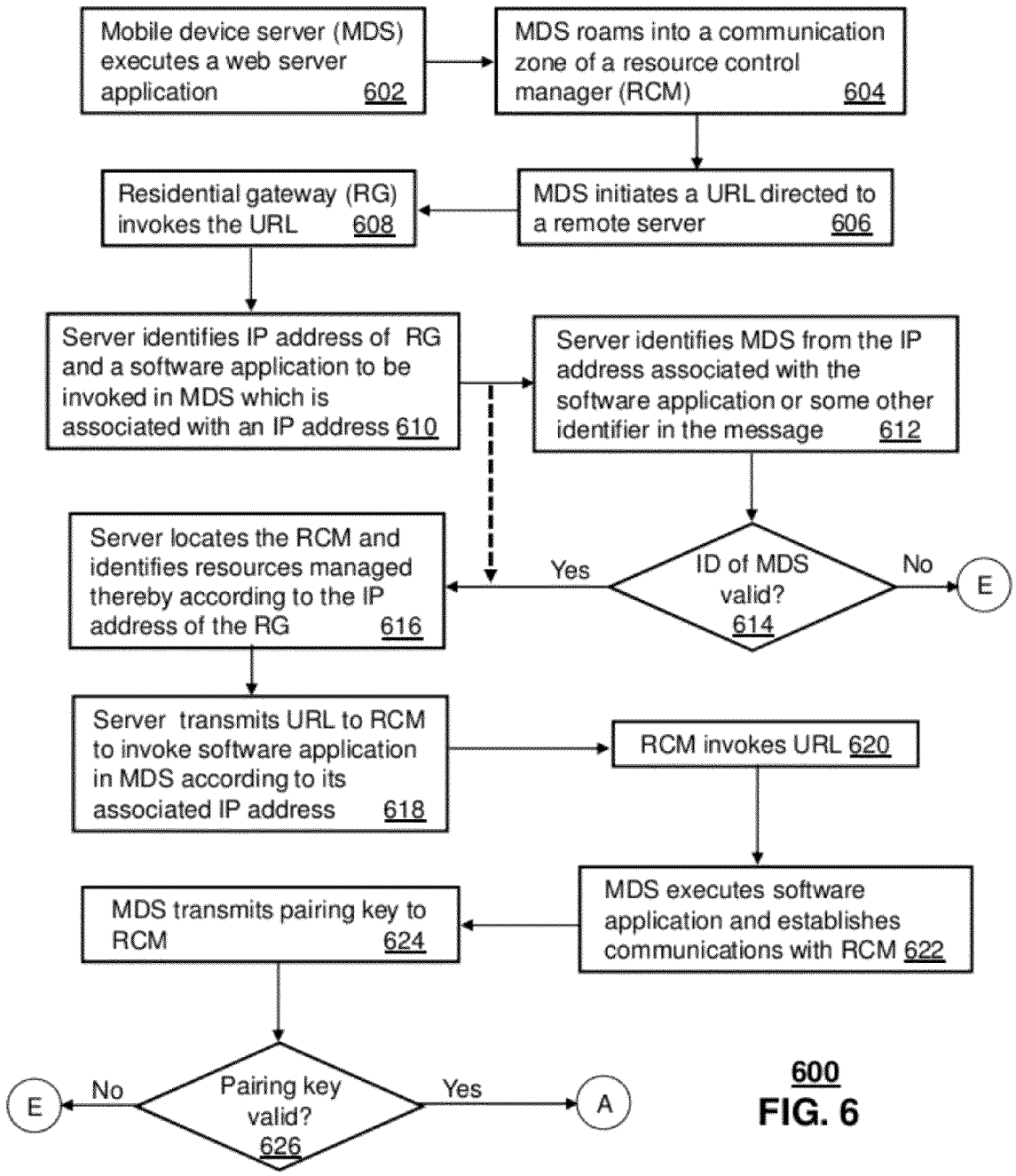
FIGS. 6-7 depict illustrative embodiments of methods operating in portions of the systems and components of FIGS. 1-5.
Figure 7:
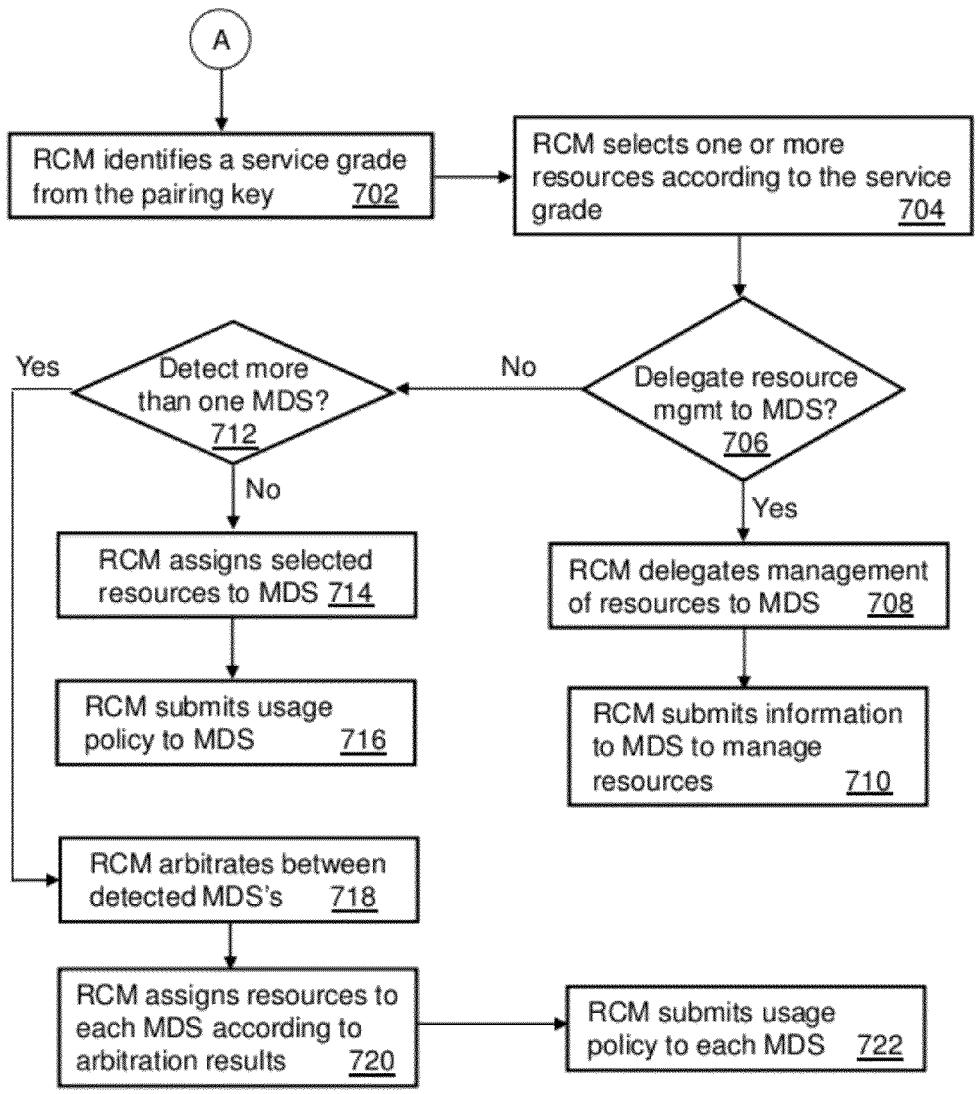

FIG. 5 depicts an illustrative embodiment of a system 500 that can operate according to methods 600-700 described in FIGS. 6-7. System 500 can comprise a mobile device server 504 that can roam into a building 502 (residence or commercial establishment). The mobile device server 504 can represent a portable telephone such as a cellular telephone or a cordless telephone comprising in whole or in part the components of the communication device 400 shown in FIG. 4 and described in accompanying text. The mobile device server 504 can be a portable telephony device which can execute a web server application 505. Other embodiments of the mobile device server 504 such as a Personal Digital Assistant (PDA) (e.g., an iPAD™) adapted to execute a web server application 505 are contemplated by the present disclosure. For illustration purposes, the present disclosure will make references to the components shown in FIG. 4 when discussing the operations of the mobile device server 504.

A web server application 505 can represent a hypertext transfer protocol (HTTP) web server application implemented in software, hardware or combinations thereof operating from the controller 406 of the mobile device server 504. A web server application 505 can also be represented by a web server application used by a server or hosting computer system. Accordingly, multiple types of web server application 505 operational in the mobile device server 504 is contemplated by the present disclosure.

System 500 can further include a media processor 506 and a gateway 508 that can provide wireless communication services to the media processor 506 and other devices in the building 502 such as a computing device 520, a gaming console 516, and a resource control manager 518. The resource control manager 518 can be a standalone computing device as shown in FIG. 5. In another embodiment, the resource control manager 518 can be an integral part of the gateway 508. In another illustrative embodiment, the functions of the resource control manager 518 can be distributed among several devices. The resource control manager 518 can be utilized to manage usage of media and computing resources of the media resource center 530 by the mobile device server 504.

System 500 can also comprise an ISP network 510 that provides private or public Internet services to building 502. By way of the ISP network 510, the resource control manager 518 can communicate with a remote server 512 for purposes of managing resources made available to the mobile device server 504 as will be described below. A database 514 can be communicatively coupled to the remote server 512 to provide resource management services to one or more resource control managers 518 operating from a plurality facilities.

FIGS. 6-7 depict illustrative embodiments of methods 600-700 that operate in portions of the devices of FIGS. 1-5. Method 600 begins with step 602 in which the mobile device server 504 of FIG. 5 executes a web server application 505. Step 602 can be initiated by a user manipulating the user interface of the mobile device server 504. Alternatively, the web server application 505 can be automatically initiated by other triggers such as time of day, a user profile, or combinations thereof.

The web server application 505 in the mobile device server 504 can be operable to detect in step 604 a resource control manager 518 when roaming into a communication zone of the resource control manager 518. The communication range of the communication zone can be driven by the wireless service characteristics of the gateway 508. Step 604 can represent the web server application 505 of the mobile device server 504 scanning for media resources in building 502 by way of gateway 508 providing access to a wireless network. The gateway 508 can be a WiFi router and modem combination which is communicatively coupled to the ISP network 510 by way of a wired interface such as a coaxial cable or telephone wire interface.

The web server application 505 of the mobile device server 504 can scan for the presence of media resources such as the media processor 506 by requesting information from the resource control manager 518. The resource control manager 518 can transmit to the mobile device server 504 a list of the active devices on the WiFi network. Alternatively, or in combination, the web server application 505 of the mobile device server 504 can transmit a broadcast message on the WiFi network requesting identification of the devices communicatively coupled to the WiFi network. Other identification techniques are contemplated by the present disclosure.

Once the resource control manager 518 has been discovered, the web server application 505 can present the detected media resource(s) to a user over the UI 404 of the mobile device server 504. The user can manipulate the UI 404 as previously described to indicate a desire to establish communications with the resource control manager 518. Alternatively, or in combination, a need to establish communications with the resource control manager 518 can be detected from a prior history of user actions, a profile established by the user of the mobile device server 504 indicating a preference for establishing communications with the resource control manager 518, or other triggers that may be definable by user behavior or user-established settings.

In step 606, the web server application 505 in the mobile device server 504 can initiate a URL directed to the remote server 512 by way of the gateway 508. The following is an illustrative embodiment of a URL that can be initiated by the mobile device server 504: http://someServer.com/launchApp?special_app=http://<IP address of MDS x.x.x.x>/mrml.xml. The URL can include a domain name of the remote server 512 and instructions to launch a specific software application executable by the web server application 505 in the mobile device server 504. The URL can also include an IP address of the mobile device server 504 which can be used to launch the software application. In step 608, the gateway 508 can attach localization information in the form of header information into an IP header source for network address translation or an HTTP header prior to forwarding the URL to the remote server 512.

The server 512 can receive the URL message by way of the ISP network 510 of FIG. 5. The server 512 can in turn identify in step 610 from the HTTP header the IP address of the gateway 508. The server 512 can also identify from the URL message the software application to be invoked by the mobile device server 504 (e.g., special_app_to_enable_comm_with_resource_ctrl_mgr), and the IP address associated with the software application which can be used to identify the software application and/or the mobile device server 504.

In step 612, the remote server 512 can authenticate the request from the mobile device server 504 using the IP address of the mobile device server 504 or some other identifier added to the URL message (e.g., MAC address of the mobile device server 504). If the server 512 does not recognize the mobile device server 504 in step 614, method 600 can cease. Otherwise, if authentication is successful, the server 512 can proceed to step 616. Authentication of the mobile device server 504 can be delegated to the resource control manager 518, in which case steps 612 and 614 may be bypassed.

At step 616, the server 512 can be operable to locate the resource control manager 518 and media resources managed thereby according to the detected IP address of the gateway 508. The server 512 can locate the resource control manager 518 from a look-up table in a database 514 operating, for example, as a Domain Name Server (DNS), a subscriber database, or combinations thereof. Once the resource control manager 518 and resources managed thereby have been identified, the server 512 can transmit to the resource control manager 518 in step 618 a new URL message to invoke the software application in the mobile device server 504 according to the IP address of the mobile device server 504. The following is an illustrative embodiment of a URL message that can be transmitted to the resource control manager 518: http://<IP address of MDS x.x.x.x>/mrml.xml.

Once the resource control manager 518 invokes this URL in step 620, the web server application 505 in the mobile device server 504 can be operable to execute the software application (special_app_to_enable_comm_with_resource_ctrl_mgr) in step 622 to establish an initial state of communications with the resource control manager 518. Authentication of the mobile device server 504 can take place in steps 624-626 prior to enabling communication services between the mobile device server 504 and resources managed by the resource control manager 518. In step 624, the mobile device server 504 can transmit authentication data to the resource control manager 518. The authentication data can comprise, for example, a pairing key programmed in the mobile device server 504 by the service provider of the interactive communication systems of FIGS. 1-2. The pairing key can be encrypted data, a public key infrastructure (PKI) key, a personal identification number (PIN), login or password, or other forms of security technology. The pairing key can be utilized to prevent mobile device servers 504 from utilizing media resources of the communication systems of FIGS. 1-2 unless authorized by the service provider of these systems.

If the authentication data is invalid or not recognized, method 600 ceases. Otherwise, the resource control manager 518 proceeds to step 702 of FIG. 7 where it identifies a service grade from the pairing key. The resource control manager 518 can maintain a database of pairing keys from prior interactions, or can submit a request to a server in one of the communication systems of FIGS. 1-2 (such as server 512) to request an identification of the service grade assigned to the mobile device server 504. The service grade can identify the extent of services offered to the mobile device server 504. A service provider can, for example, brand services as Platinum, Gold or Bronze. Platinum services can for example represent all media services and resources (e.g., computer 520, media processor 506, and gaming console 516) which can be made available to the mobile device server 504. Gold services can represent less services and resources than Platinum services, but more services and resources than Bronze.

The service provider of the communication systems of FIGS. 1-3 can utilize more complex service schemes by defining subservices within a particular service category. For example, Platinum services can have sublevel service grades for the media processor 506 (e.g., premium channels vs. basic channels), the gaming console 516 (e.g., unlimited access to games vs a limited subset of games with the option to purchase others in an on-demand model), and the computing device 520 (e.g., various levels of access to CPU resources, and memory storage). In sum, any form of service grades can be defined by the service provider. Unique pairing keys can be generated by the service provider and programmed in a mobile device server 504 to identify a subscriber's service grade.

Once the service grade has been identified, the resource control manager 518 can select in step 704 one or more resources which can be utilized by the mobile device server 504 according to the service grade assigned thereto. In step 706, the resource control manager 518 can also delegate management of the selected resources to the mobile device server 504 based on its service grade. In this embodiment, the mobile device server 504 can be authorized to manage the selected resources without interference by the resource control manager 518. If delegation is appropriate, the resource control manager 518 can inform the mobile device server 504 in step 708 that it is delegating management of the selected resources to the mobile device server 504.

To assist the mobile device server 504, the resource control manager 518 can transmit to the mobile device server 504 in step 710 information associated with delegated services to assist the mobile device server 504 in managing these services. The information can include provisioning data, service provider and subscriber usage policies, telemetry data, and other suitable information for managing these resources. Provisioning data can represent an identification of services enabled and available for use by the mobile device server 504. Service provider usage policies can define how these resources can be used by the mobile device server 504 and other devices managed by the mobile device server 504.

For example, a service provider usage policy can identify digital rights management policies, Quality of Service policies, bandwidth management policies, and so on. Subscriber policies can represent subscriber usage preferences such as media content preferences, usage policies (time of day, blocked periods, parental controls, etc.), load management policies, and so on. Subscriber policies can be established through the portal services described in FIG. 3. For example, a web page can be presented to a subscriber which identifies a list of customizable options to establish a resource management policy to be followed by the resource control manager 518 when enabling or delegating services to a mobile device server 504.

Referring back to step 706, if delegation is not appropriate for the given service grade, the resource control manager 518 can proceed to step 712 where it determines if other mobile device servers 504 are present in the network established by the gateway 508. If only one mobile device server 504 is present, the resource control manager 518 can proceed to step 714 where the resource control manager 518 assigns the selected resources to the mobile device server 504. In step 716, the resource control manager 518 can transmit to the mobile device server 504 a usage policy summarizing the service provider and subscriber usage policies previously described. From this point, the mobile device server 504 can begin to utilize the resources assigned in step 714.

Referring back to step 712, if the resource control manager 518 detects that more than one mobile device server 504 is requesting the same resources, the resource control manager 518 can proceed to step 718 where it can arbitrate between the detected mobile device servers 504. The arbitration process can prompt each user of the mobile device servers 504 to make concessions. Alternatively, or contemporaneously, the resource control manager 518 can address arbitration on the basis of the mobile device server 504 with the higher service grade (or sublevels of service grades). It is contemplated that any arbitration technique can be applied in step 716. Once arbitration has been completed, the resource control manager 518 can proceed to step 720 where the resource control manager 518 assigns resources to each mobile device server 504 according to the arbitration results. The assignment can represent a distribution of resources with or without sharing of such resources. That is, some resources might be shared between multiple mobile device servers 504 (e.g., a media processor 506) while others are assigned exclusively to one of the mobile device servers 504 (e.g., gaming console 516). In step 722, the resource control manager 518 can transmit to each mobile device server 504 a usage policy as previously described for the arbitrated resources.

The present disclosure contemplates a mobile device server 504 that among other things is capable of detecting media resources managed by the resource control manager 518 and acquire access to all or a portion of such resources according to the illustrative embodiments of methods 600-700 of FIGS. 6-7. By mobilizing a web server application 505 by way of a mobile device server 504 as described above it may no longer be necessary for media resources to be managed exclusively by way of infrastructure devices such as those shown in FIGS. 1-3, which are generally not portable.

Upon reviewing the aforementioned embodiments, it would be evident to an artisan with ordinary skill in the art that said embodiments can be modified, reduced, or enhanced without departing from the scope and spirit of the claims described below. For example, methods 600-700 can be adapted so that a mobile device server 504 can communicate with other mobile device servers 504. In this configuration, one of the mobile device servers 504 can function in part as the resource control manager 518 in a master-slave configuration. The mobile device server 504 operating as the resource control manager 518 can assign and/or delegate services according to the service grade of the requesting mobile device server 504.

In one embodiment, FIG. 5 can be adapted so that the resource control manager 518 is located remotely from building 502. In another embodiment, the resource control manager 518 can be an integral part of remote server 512, or can operate from a computing device that is communicatively coupled to the remote server 512. In another embodiment, the resource control manager 518 can be adapted to offer the mobile device server 504 resources which are remote from a vicinity of building 502. The remote resources can be in one or more other buildings or distributed in the networks of FIGS. 1-3. The remote resources can include without limitation computing resources, storage resources, media processing resources, or other resources which can be made accessible to a mobile device server 504. In yet another embodiment, the resource control manager 518 can be adapted to communicate with other resource control managers 518 located in the networks of FIGS. 1-3 or other residential or commercial buildings remote from building 502. In this embodiment, a resource control manager 518 can request and/or exchange resources with other resource control managers 518 to expand the reach and access of resources made available to mobile device servers 514.

Other suitable modifications can be applied to the present disclosure without departing from the scope of the claims below. Accordingly, the reader is directed to the claims section for a fuller understanding of the breadth and scope of the present disclosure.

Figure 8:
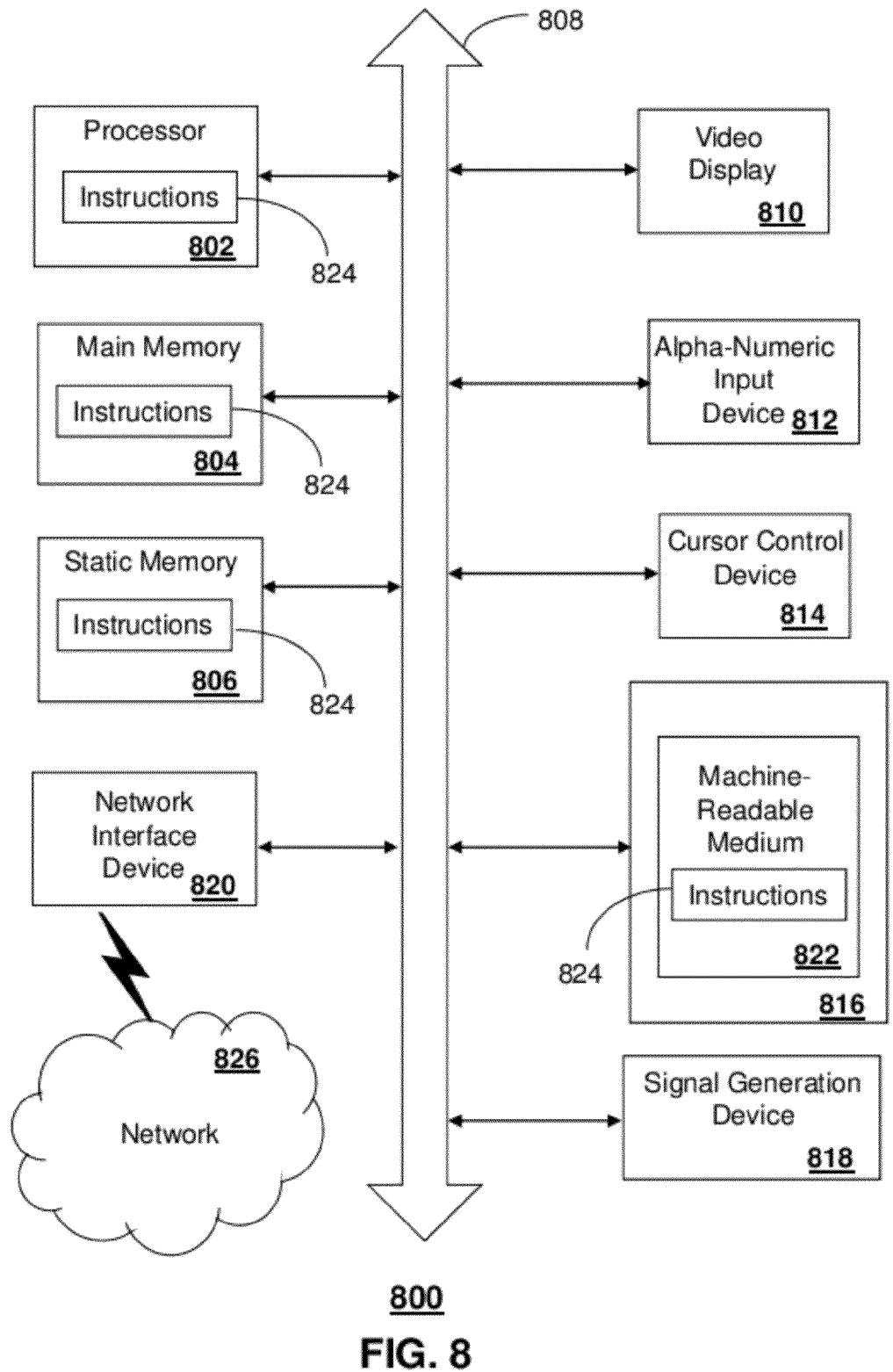
FIG. 8 is a diagrammatic representation of a machine in the form of a computer system within which a set of instructions, when executed, can cause the machine to perform any one or more of the methodologies discussed herein.

FIG. 8 depicts an exemplary diagrammatic representation of a machine in the form of a computer system 800 within which a set of instructions, when executed, may cause the machine to perform any one or more of the methodologies discussed above. The machine can operate, for example, as the mobile device server 504, the media processor 506, the gateway 508, the remote server 512, or combinations thereof as described above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, or encoding a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; and magneto-optical or optical medium such as a disk or tape. Accordingly, the disclosure is considered to include any one or more of a machine-readable medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A portable communication device, comprising:
a display for presenting media content;
a memory to store computer instructions including web server application instructions; and
a controller coupled to the memory and the display, wherein the controller, responsive to executing the web server application instructions, performs operations comprising:
enabling voice communication sessions with other communication devices;
detecting a first resource control manager while roaming, wherein the first resource control manager operates from a first mobile communication device having voice communication capability, wherein the first resource control manager is communicatively coupled to a plurality of first resources accessible to the portable communication device and is communicatively coupled to a second resource control manager operating from a second mobile communication device, wherein the first resource control manager manages usage of the plurality of first resources, and wherein the second resource control manager manages usage of a plurality of second resources;
facilitating establishing communications with the first resource control manager;
transmitting a pairing key to the first resource control manager;
receiving authorization from the first resource control manager to pair with a target resource selected by the first resource control manager from the plurality of second resources according to the pairing key; and
facilitating establishing communications with the target resource for usage that is being managed by the second resource control manager operating from the second mobile communication device.

2. The portable communication device of claim 1, wherein the operations further comprise:
transmitting a message to a server by way of a gateway assigned to a first IP address responsive to detecting the first resource control manager, wherein the message comprises an identifier of a software application in the portable communication device and a second IP address associated with the software application; wherein the message causes the server to identify the first resource control manager from the first IP address of the gateway, and wherein the message causes the server to direct the first resource control manager to invoke the software application in the portable communication device utilizing the second IP address;
receiving a request from the first resource control manager to execute the software application utilizing the second IP address; and
executing the software application to establish communications with the first resource control manager.

3. The portable communication device of claim 1, wherein the first and second resource managers are in a master-slave arrangement, and wherein the first plurality of resources includes a set top box, a gaming console and a storage device.

4. The portable communication device of claim 1, wherein the web server application instructions comprise a hypertext transfer protocol server application.

5. The portable communication device of claim 1, wherein communications between the portable communication device and the first resource control manager conform in part to a markup language.

6. The portable communication device of claim 5, wherein the markup language corresponds to an extensible markup language.

7. The portable communication device of claim 2, wherein the message transmitted to the server comprises a uniform resource locator with a plurality of descriptors that identify the software application and the second IP address, and wherein the gateway inserts the first IP address into a hypertext transfer protocol header of the message.

8. The portable communication device of claim 1, wherein the transmitting of the pairing key to the first resource control manager
causes the first resource manager to identify a service grade from the pairing key and select the target resource according to the service grade.

9. The portable communication device of claim 8, wherein the target resource comprises a set-top box, wherein the plurality of first resources are located at a first premises, and wherein the plurality of second resources are located at a second that is different from the first premises.

10. The portable communication device of claim 1, wherein the controller receives the target resources based on the first resource control manager arbitrating an assignment of the target resource between the portable communication device and another portable communication device.

11. The portable communication device of claim 1, wherein the operations further comprise:
submitting to the first resource control manager a request to delegate management of a subset of resources under control of the first resource control manager to the portable communication device;
receiving from the first resource control manager an acceptance to the request in response to the first resource control manager determining that the pairing key authorizes the portable communication device to manage the subset of resources; and
receiving from the first resource control manager information relating to the subset of resources managed by the first resource control manager for purposes of managing the subset of resources.

12. The portable communication device of claim 11, wherein the pairing key enables the first resource control manager to select the subset of resources according to the pairing key and according to a policy for managing the subset of resources, and wherein the policy is defined by a service provider of the first resource control manager.

13. The portable communication device of claim 1, wherein the portable communication device comprises a cellular telephone.

14. A tangible computer-readable storage device comprising computer instructions including web server application instructions which, responsive to being executed by a mobile device server, cause the mobile device server to perform operations comprising:
detecting a first resource control manager while the mobile device server is roaming in a communication zone associated with the first resource control manager, wherein the first resource control manager operates from a first mobile device;
transmitting a pairing key to the first resource control manager;
receiving authorization from the first resource control manager to pair with a target resource selected by the first resource control manager according to the pairing key, wherein usage of the target resource is managed by a second resource control manager operating from a second mobile device, wherein the first and second resource managers are in a master-slave arrangement; and
establishing communications with the target resource selected by the first resource control manager.

15. The tangible computer-readable storage device of claim 14, wherein the operations further comprise:
receiving a usage policy from the first resource control manager; and
utilizing the target resources according to the usage policy.

16. The tangible computer-readable storage device of claim 14, wherein the operations further comprise sending a request to the first resource control manager to delegate management of a subset of resources to the mobile device server.

17. The tangible computer-readable storage device of claim 14, wherein the operations further comprise:
transmitting a message to a remote server by way of a gateway assigned to a first Internet Protocol (IP) address responsive to detecting the first resource control manager, wherein the message comprises an identifier of a software application in the mobile device server and a second IP address associated with the software application;
wherein the message causes the remote server to identify the first resource control manager according to the first IP address of the gateway, and
wherein the message causes the remote server to direct the first resource control manager to invoke the software application in the mobile device server utilizing the second IP address.

18. A resource control manager device, comprising:
a display for presenting media content;
a memory to store computer instructions; and
a controller coupled with the memory and the display, wherein the controller, responsive to executing the computer instructions, performs operations comprising:
enabling establishing voice communication sessions with other communication devices;
managing a plurality of first resources communicatively coupled to the resource control manager device;
receiving a pairing key from a web server application operating in a mobile device server;
identifying a service grade from the pairing key;
communicating with a mobile communication device that manages a plurality of second resources, wherein the mobile communication device is capable of establishing voice communication sessions with other communication devices;
selecting a target resource from the plurality of second resources according to the service grade; and
transmitting to the mobile device server authorization to pair with the target resource managed by the mobile communication device.

19. The resource control manager device of claim 18, wherein the operations further comprise:
receiving from a remote server instructions to invoke a software application identified by the web server application operating in the mobile device server; and
establishing communications with the mobile device server responsive to invoking the software application, wherein communications between the resource control manager device and the mobile device server conform to a mark-up language.

20. The resource control manager device of claim 18, wherein the resource control manager device is in a master-slave arrangement with the mobile communication device, and wherein the target resource comprises a gaming console.

* * * * *